(12) United States Patent
Hartsock et al.

(10) Patent No.: US 12,403,810 B2
(45) Date of Patent: Sep. 2, 2025

(54) RAMP ASSEMBLY FOR A PASSENGER VEHICLE

(71) Applicant: The Braun Corporation, Winamac, IN (US)

(72) Inventors: Mason Hartsock, Winamac, IN (US); Nate Martindale, Winamac, IN (US)

(73) Assignee: The Braun Corporation, Winamac, IN (US)

( * ) Notice: Subject to any disclaimer, the term of this patent is extended or adjusted under 35 U.S.C. 154(b) by 114 days.

(21) Appl. No.: 17/880,891

(22) Filed: Aug. 4, 2022

(65) Prior Publication Data

US 2023/0043284 A1 Feb. 9, 2023

Related U.S. Application Data

(60) Provisional application No. 63/229,653, filed on Aug. 5, 2021.

(51) Int. Cl.
*B60P 1/43* (2006.01)
*A61G 3/06* (2006.01)

(52) U.S. Cl.
CPC .............. *B60P 1/438* (2013.01); *A61G 3/061* (2013.01); *Y10S 414/134* (2013.01)

(58) Field of Classification Search
CPC . A61G 3/061; B60P 1/438; B60P 1/43; Y10S 414/134
See application file for complete search history.

(56) References Cited

U.S. PATENT DOCUMENTS

| 4,984,955 A | 1/1991 | McCullough |
| 5,672,041 A | 9/1997 | Ringdahl et al. |
| 7,001,132 B2 * | 2/2006 | Koretsky ............... A61G 3/061 414/921 |

(Continued)

FOREIGN PATENT DOCUMENTS

| DE | 4413444 A1 * | 10/1995 | ................ B60P 1/43 |
| DE | 202014009765 U1 * | 4/2015 | .............. B60P 1/438 |

(Continued)

OTHER PUBLICATIONS

International Search Authority (European Patent Office), Invitation to Pay Additional Fees, PCT/US2022/039384, Oct. 27, 2022 (7 pages).

(Continued)

*Primary Examiner* — James Keenan
(74) *Attorney, Agent, or Firm* — Daniel Tallitsch; Tyler Schultz

(57) ABSTRACT

A ramp assembly for providing passenger access to a passenger vehicle. The ramp assembly includes a ramp having a first ramp plate, a second ramp plate rotatably coupled to the first ramp plate, and a ramp assist assembly. A ramp fold arm is coupled to the ramp assist assembly and to the first ramp plate, wherein the ramp assist assembly directs deployment and retraction of the ramp plate. The link system is connected to the ramp fold arm and to the second ramp plate, wherein the link system includes a slide mechanism coupled to an underside of the first ramp plate. The slide mechanism maintains tension for the link system when deploying and retracting the ramp from the vehicle.

16 Claims, 8 Drawing Sheets

(56) References Cited

U.S. PATENT DOCUMENTS

| | | | | |
|---|---|---|---|---|
| 7,908,695 B2* | 3/2011 | Budd | ............... | A61G 3/061 |
| | | | | 14/71.3 |
| 8,782,840 B2* | 7/2014 | Saucier | ............... | B60P 1/438 |
| | | | | 14/71.3 |
| 2008/0184500 A1* | 8/2008 | Bettcher | ............... | A61G 3/061 |
| | | | | 14/71.1 |

FOREIGN PATENT DOCUMENTS

| | | | | |
|---|---|---|---|---|
| DE | 202016105411 U1 * | 2/2018 | ............ | A61G 3/061 |
| EP | 2631118 A1 | 8/2013 | | |
| FR | 2822112 A1 * | 9/2002 | ............... | B60P 1/43 |
| GB | 723723 A * | 2/1955 | ............... | B60P 1/43 |
| IT | MO20110311 A1 | 5/2013 | | |

OTHER PUBLICATIONS

International Search Authority (European Patent Office), International Search Report, Search Strategy, and Written Opinion, PCT/US2022/039384, Oct. 27, 2022 (15 pages).

* cited by examiner

RAMP ASSEMBLY FOR A PASSENGER VEHICLE

CROSS REFERENCE TO RELATED APPLICATIONS

This application claims priority to U.S. Provisional Patent Application No. 63/229,653, filed on Aug. 5, 2021 and entitled RAMP ASSEMBLY FOR A PASSENGER VEHICLE, the contents of which is incorporated herein by reference.

FIELD OF THE DISCLOSURE

The present application relates to a passenger vehicle for transporting one or more passengers, and more particularly to a modified passenger vehicle having a ramp assembly which provides access to a physically limited passenger for the vehicle.

BACKGROUND

Automobile manufacturers do not currently mass-produce passenger motor vehicles specifically designed to transport passengers having physical limitations, either as a driver or as a non-driving passenger. Consequently, mass-produced passenger vehicles are modified, or retrofitted, by a number of aftermarket companies dedicated to supplying vehicles to physically limited passengers. Such vehicles can be modified by removing certain parts or structures within a vehicle and replacing those parts with parts specifically designed to accommodate the physically limited passenger. For example, in one configuration, a van is retrofitted with a ramp to enable a physically limited individual using a wheelchair to enter and exit the vehicle without the assistance of another individual.

Other known products for retrofitting a vehicle, such as a van or sport utility vehicle, include wheel chair lifts, lift platforms, and lowered floor surfaces. In some instances, a door or door entry of an original equipment manufacturer (OEM) van is enlarged or otherwise modified to permit entry and exit of the physically limited individual through what is known as the assisted entrance. Once inside the van, the individual who uses the assisted entrance is located in a rear passenger compartment of the van adjacent to or behind the assisted entrance. In other configurations, the van is retrofitted to allow an individual to be located throughout the van, including the same location as the front row seats.

In one known retrofitted van, the sliding side door moves toward the back of the vehicle to open a passenger entrance as well as to provide access to a ramp. In some vehicles, which are considered as viable candidates for retrofitting, the construction of the OEM vehicle requires significant modification to accommodate the addition of a ramp. In one or more modifications of the OEM vehicle, the door opening needs to be widened to provide access to a wheelchair. Consequently, what is needed is a ramp system that fits within a modified passenger door opening of the OEM vehicle.

SUMMARY

In one embodiment, there is provided a ramp assembly for providing passenger access to a passenger vehicle including a first ramp plate, a second ramp plate rotatably coupled to the first ramp plate, and a ramp assist assembly. A ramp fold arm is coupled to the ramp assist assembly and to the first ramp plate, wherein the ramp assist assembly directs deployment and retraction of the ramp plate. A link system is connected to the ramp fold arm and to the second ramp plate, wherein the link system includes a slide mechanism coupled to an underside of the first ramp plate.

In some embodiments, the ramp assembly includes wherein the link system has a cam coupled to the second ramp plate and a flexible link coupled to the slide mechanism and to the cam.

In some embodiments, the ramp assembly includes wherein the flexible link is one of a chain, a cable, a belt, or a hose.

In some embodiments, the ramp assembly includes wherein the slide mechanism has a slide bar slidably connected to the underside of the first ramp plate and the flexible link is coupled to the slide bar.

In some embodiments, the ramp assembly includes wherein the slide bar has a generally planar portion connected to the underside of the first ramp plate, a first bend extending from the planar portion, and a second bend extending from the planar portion, wherein the first bend is coupled to the flexible link and the second bend is coupled to the ramp fold arm.

In some embodiments, the ramp assembly further includes a first connector coupled to the underside of the first ramp plate, wherein a slot of the generally flat portion slidingly engages the first connector.

In some embodiments, the ramp assembly further includes a roller connected to the first ramp plate and ramp fold arm includes a roller slot, wherein the roller extends through the roller slot, to enable the ramp fold arm to move with respect to the first ramp plate.

In some embodiments, the ramp assembly further includes a second connector coupled to the ramp fold arm and to the second bend of slide bar.

In some embodiments, the ramp assembly includes wherein the ramp fold arm has a connector slot and the second connector extends through the connector slot to enable the slide bar to move with respect to the ramp fold arm.

In some embodiments, the ramp assembly includes wherein the connector slot is inclined with respect to the roller slot.

In some embodiments, the ramp assembly includes wherein the slide mechanism has a link rod connected to the slide bar to provide support to the slide bar.

In another embodiment, there is provided a passenger vehicle to transport passenger confined to a wheelchair including an entry to enable the passenger confined to the wheelchair to exit and to enter an interior of the vehicle. A ramp assembly is located at the entry, the ramp assembly including a first ramp plate, a second ramp plate rotatably coupled to the first ramp plate, and a ramp assist assembly. A ramp fold arm assembly is coupled to the ramp assist assembly and to the first ramp plate, wherein the ramp assist assembly directs deployment and retraction of the ramp plate. A link system is connected to the ramp fold arm assembly and to the second ramp plate, wherein the link system includes a slide mechanism coupled to an underside of the first ramp plate.

In some embodiments, the passenger vehicle includes wherein the link system has a cam coupled to the second ramp plate and a flexible link coupled to the slide mechanism and to the cam.

In some embodiments, the passenger vehicle includes wherein the flexible link is one of a chain, a cable, a belt, or a hose.

In some embodiments, the passenger vehicle includes wherein the slide mechanism has a slide bar slidably connected to the underside of the first ramp plate and the flexible link is coupled to the slide bar.

In some embodiments, the passenger vehicle includes wherein the slide bar has a generally planar portion slidably connected to the underside of the first ramp plate, a first bend extending from the planar portion, and a second bend extending from the planar portion, wherein the first bend is coupled to the flexible link and the second bend is coupled to the ramp fold arm.

In some embodiments, the passenger vehicle further includes a first connector coupled to the underside of the first ramp plate, wherein a slot of the generally flat portion slidingly engages the connector.

In some embodiments, the passenger vehicle further includes a second connector coupled to the ramp fold arm and to the second bend of slide bar.

In some embodiments, the passenger vehicle includes wherein the ramp fold arm has a connector slot and the second connector extends through the connector slot to enable the slide bar to move with respect to the ramp fold arm.

In a further embodiment, there is provided a method of deploying and retracting, from a passenger vehicle, a ramp having a first ramp plate and a second ramp plate, wherein the ramp includes a retracted position and a deployed position. The method includes: during a deploying operation, coiling a clock spring as the ramp is moved from the stowed position toward the deployed position; while coiling the clock spring, extending the second ramp plate from the first ramp plate as a slider assembly moves in a first direction along the first ramp plate to deploy the ramp; during a retracting operation, uncoiling the clock spring by raising the ramp from the deployed position to the retracted position; and while uncoiling the clock spring, moving the second ramp plate toward the first ramp plate as the slider assembly moves in a second direction along the first ramp plate to stow the ramp.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
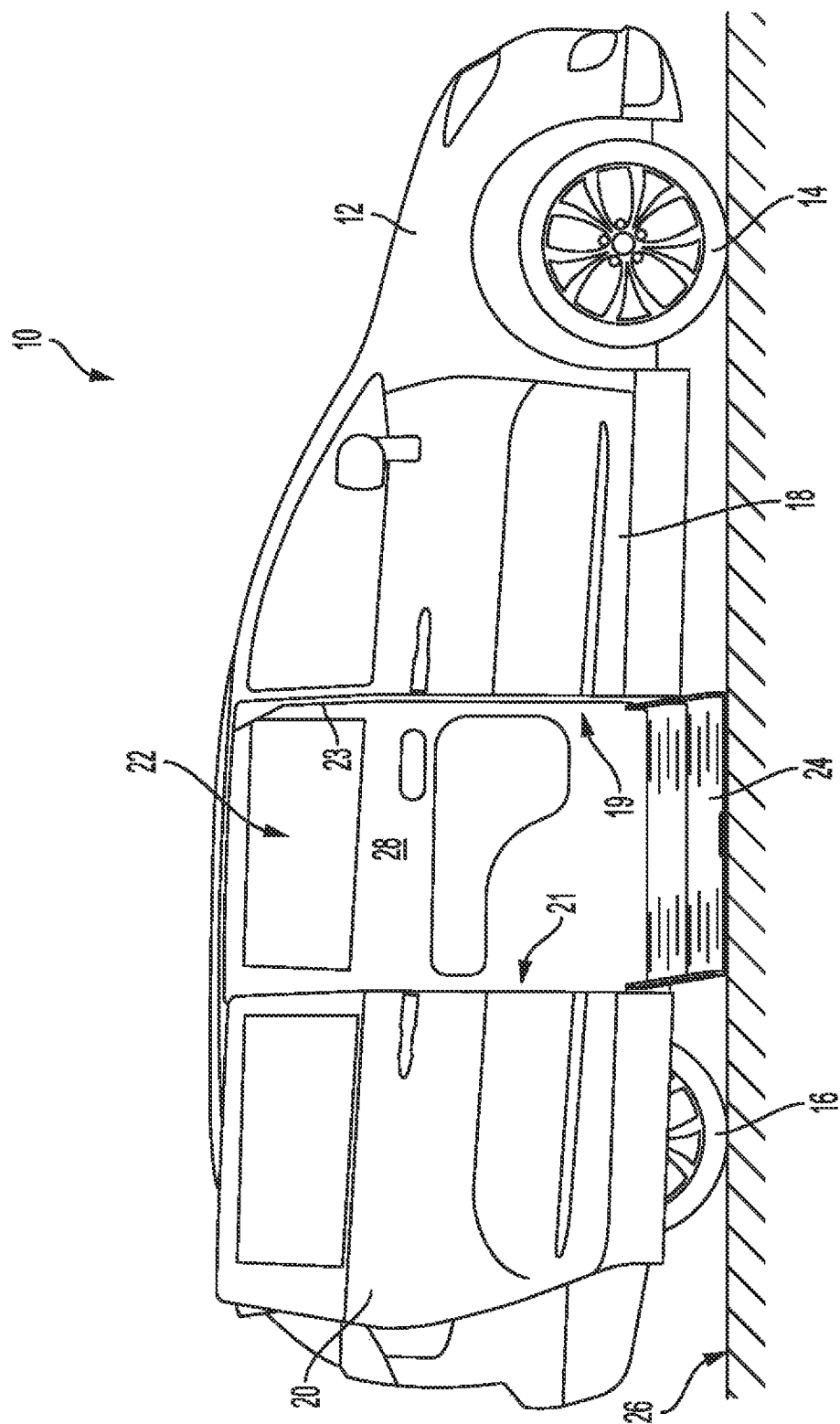
FIG. 1 illustrates an elevational side view of a passenger vehicle including an access ramp.

FIG. 1 illustrates a vehicle 10, commonly identified as a passenger van, available from any number of United States and foreign manufacturers. In the illustrated embodiment, the vehicle 10 includes a unibody construction, but other vehicles having a frame on body construction, are also contemplated for the present disclosure. Consequently, the use of a vehicle herein includes all types and kinds of vehicles with a body on frame construction, a unibody construction, or other constructions. In addition, while the passenger van 10 is illustrated in FIG. 1, the present disclosure is directed to all passenger vehicles carrying one or more passengers.

The vehicle 10 includes a body 12 operatively coupled to front wheels 14 and rear wheels 16. The vehicle 10 includes a unibody construction. A first passenger side door 18 is located between the front wheels 14 and rear wheels 16 and provides access to a passenger for sitting in a front seat of the vehicle adjacent to the driver.

The vehicle 10 includes a second passenger side door 20 coupled to the unibody frame through a sliding mechanism including three tracks. Other numbers of tracks are possible. The sliding mechanism slide along the tracks to adjust the size of an opening 22 to provide access to the interior of the vehicle 10. The opening 22 has been widened to provide improved access to a passenger seated in a wheelchair. The opening is defined on the sides thereof by an edge 19 of a B-pillar 23 and the edge 21 of the door 20. The vehicle is further modified to include a ramp assembly 24 which provides rolling access of a wheelchair from pavement 26 into an interior 28 of the vehicle 10. The ramp assembly 24 is installed at the opening 22 and is movable between the interior of the vehicle, where it is stored in some embodiments, a stowed position, and to the exterior for wheelchair access, in a deployed position as illustrated.

In known modified vehicles, such as the modified van 10, the middle row of seats is removed from the manufacturer supplied vehicle to enable a passenger seated in a wheelchair to enter and exit the vehicle on the ramp 24. Once the wheelchaired passenger moves into the interior of the vehicle, the passenger or caregiver locates the wheelchair in the middle portion of the interior behind the driver and passenger seats of the front row. In other configurations, the wheelchaired passenger is not limited to the middle row. As used herein, a wheelchaired passenger is used to indicate that the individual is making use of a wheelchair, whether that use is temporary or permanent.

Figure 2:
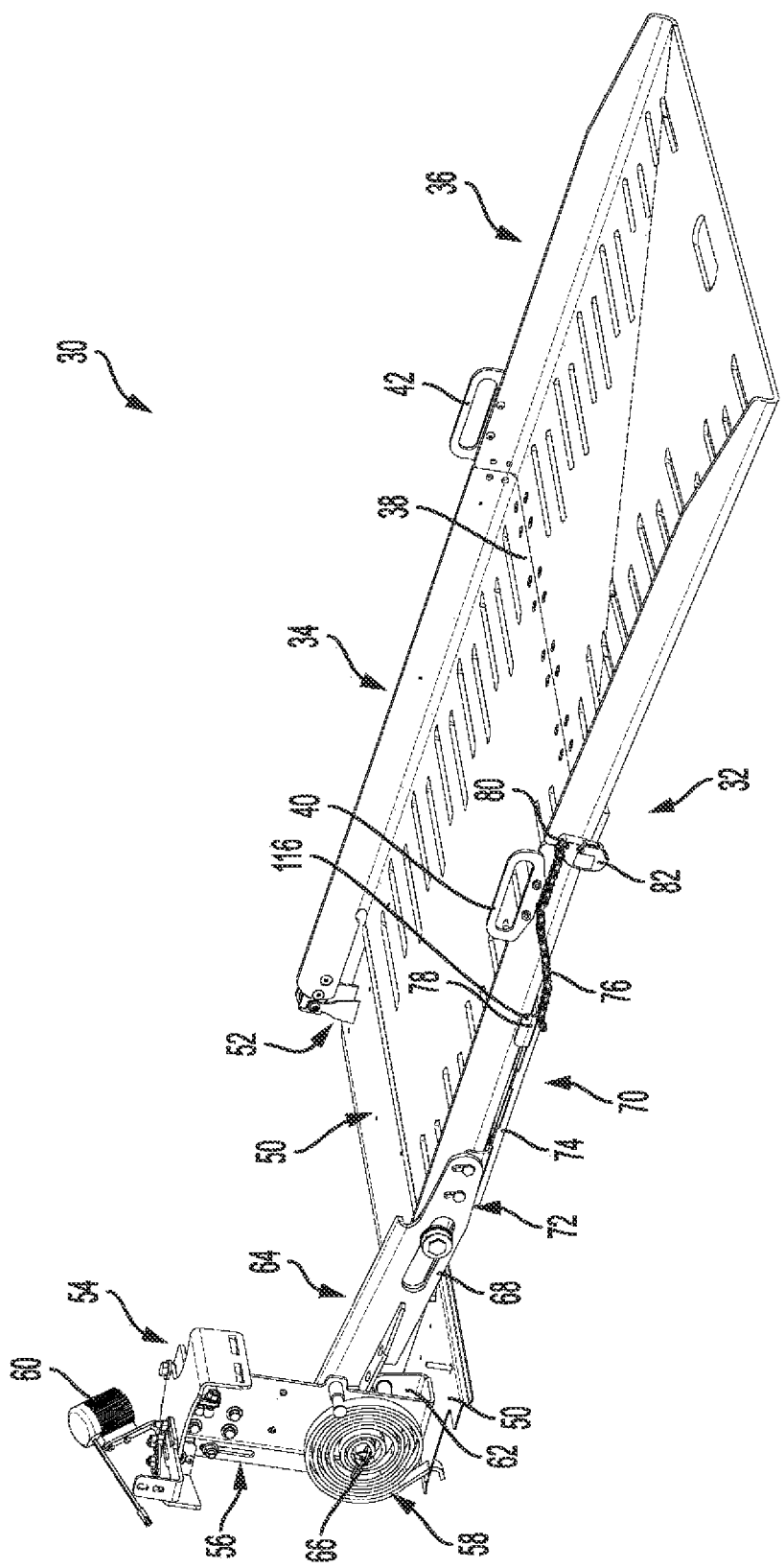
FIG. 2 illustrates a perspective side view of one embodiment of a ramp assembly including a ramp and a ramp assist assembly with the ramp in deployed position.
Figure 3:
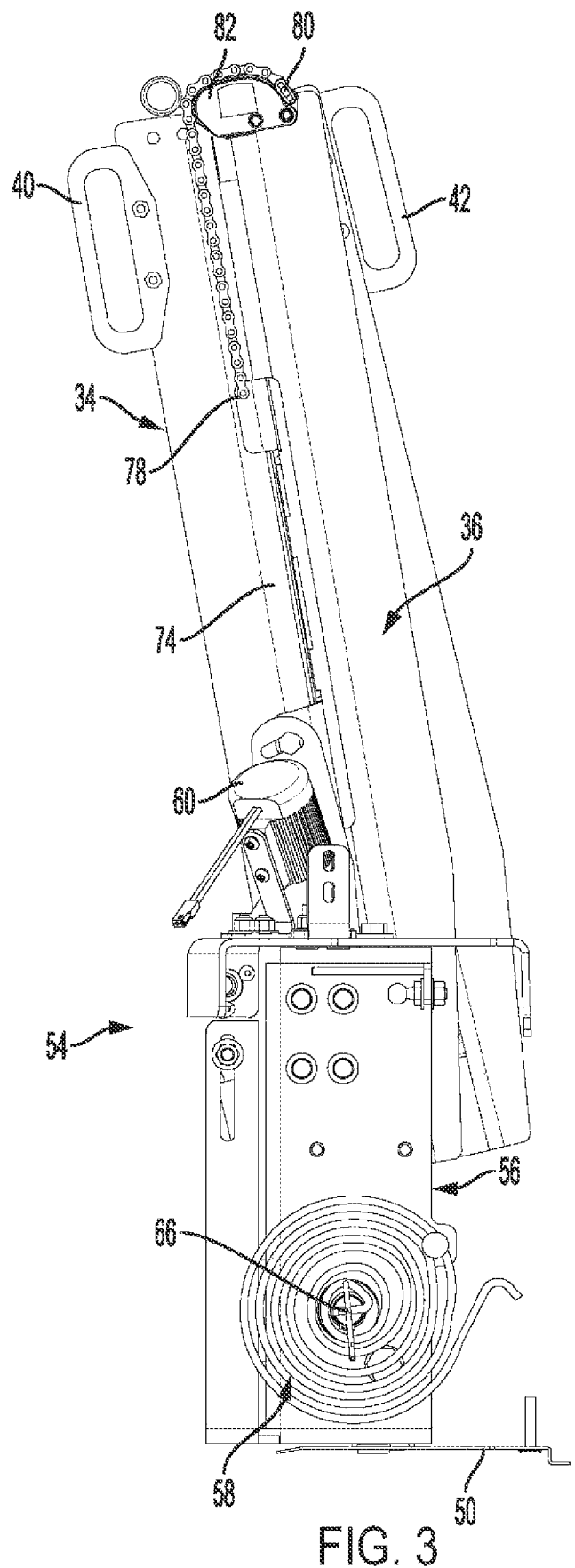
FIG. 3 illustrates a side view of a ramp assembly in a stowed position.

FIG. 2 illustrates a perspective view of one embodiment of a ramp assembly 30 including a ramp 32 having a first ramp plate 34 and a second ramp plate 36 rotatably coupled to the first ramp plate 34 at a hinge 38. A first handle 40 is coupled to the first ramp plate 34 and a second handle 42 is coupled to the second ramp plate 36. Handles 40 and 42 provide handholds for an individual to assist in moving the ramp between a stowed position of FIG. 3 and a deployed position of FIG. 2.

A floor plate 50 is fixedly connected to a floor of the vehicle 10 at the vehicle opening 22. A first standoff 52 is supported at and extends from one end the floor plate 50 to rotatably support the first ramp plate 34 at one side. A ramp assist assembly 54 is supported at and extends from another end of the floor plate 50. The ramp assist assembly 54 includes a support structure 56 that supports a clock spring 58 and a light 60. The clock spring 58 provides an assisting force to an individual when moving the ramp to a stowed position (see FIG. 3) from the deployed position of FIG. 2 and back to the stowed position. The light 60 is electrically coupled to a vehicle's electrical system and illuminates a portion of the floor plate 50 or a portion of the ramp 32.

The support structure 56 of the ramp assist assembly 54 rotatably supports a second side of the first ramp plate 34 at a second standoff 62. The support structure 56 also rotatably supports a ramp fold arm assembly 64. The ramp fold arm assembly 64 is operatively connected to a spindle 66 of the clock spring 58 which extends from the clock spring 58 through the support structure 56 and to the ramp fold arm assembly 64. The spindle 66 is offset from a rotatable support 84, i.e. pivot, of the second standoff 62. See FIG. 8. As the ramp 34 is deployed, the clock spring 58 is wound tighter, or coiled, to store energy. As the ramp 34 is retracted, the clock spring 58 unwinds to provide an assist in raising the ramp 34 from it extended or deployed position.

The ramp fold arm assembly 64 includes a swing arm 68 that is operatively connected to a link assembly 70 which extends from an end 72 of the swing arm 68. The link assembly 70 includes a link bar 74 coupled to a flexible link 76. In different embodiments, the flexible link 76 includes but is not limited to a chain, a cable, a belt, or a hose. A first end 78 of the flexible link 76 is coupled to an end of the link bar 74 and a second end 80 of the flexible link 76 is coupled to a chain cam 82. The link bar 74 is a slide mechanism configured to move, or slide, with respect to the first ramp plate 34.

Figure 4:
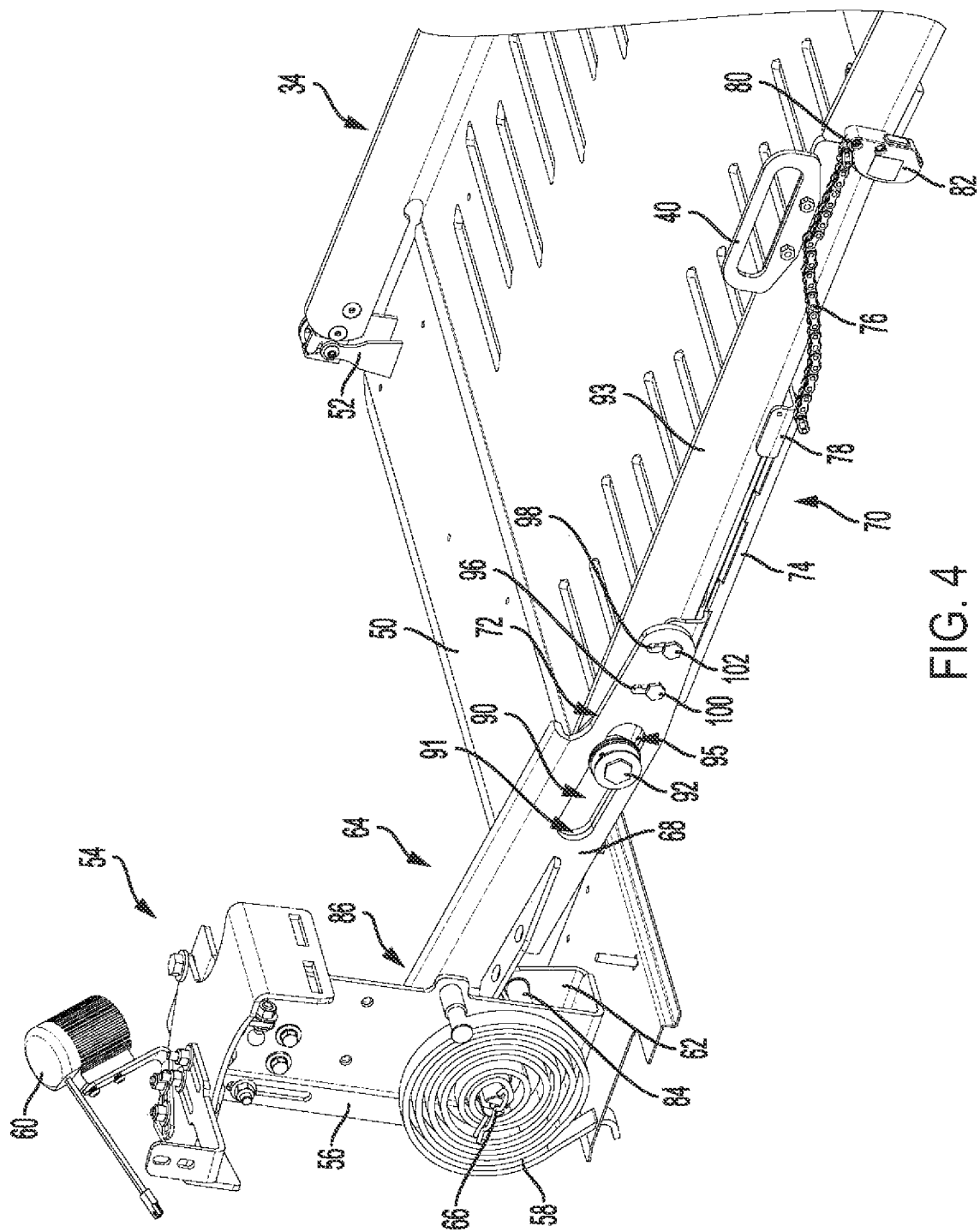
FIG. 4 illustrates a perspective side view of a portion of a ramp assembly showing a ramp in a deployed position.

As seen in FIG. 4, the second standoff 62 rotatably supports the first ramp plate 34 at the pivot 84. A first end 86 of the swing arm 68 is pivotally coupled to a pivot of the spindle 66 which is supported by the support structure 56 later described in FIG. 8. The swing arm pivot at the spindle 66 is offset by a distance from the pivot 84. The second end 72 of the swing arm 68 includes a longitudinally extending roller slot 90 configured to receive a roller 92. The roller 92 is coupled to a sidewall 93 of the first ramp plate 34 and as the ramp moves between the retracted and extended positions, the slot 90 moves along the roller 92. In the retracted position, the swing arm 68 is generally perpendicular to the surface of the plate 50 and the roller 92 is located at or near a first end 91 of the slot 90. As the first ramp plate 34 moves to the extended position of FIG. 4, the roller 92 moves towards a second end 95 of the slot. In one embodiment, the roller 92 includes a ball bearing roller to enable a smooth movement of the swing arm 68 along the roller 92.

The second end 72 of the of the swing arm 68 further includes a first slot 96 and a second slot 98. The first and second slots 96 and 98 are inclined with respect to the length of the roller slot 90. In one embodiment, the first and second slots 96 and 98 are generally perpendicular to the length of the roller slot 90. A first connector 100 and a second connector 102 extend through the slots 96 and 98 and are fixedly connected to the sidewall 93. As the first ramp plate 34 moves from the retracted position to the extended position, the slots 96 and 98 move with respect to the first and second connectors 100 and 102. As seen in FIG. 4, the connectors 100 and 102 are located at a lower end (as illustrated) of the slots 96 and 98. In the retracted position, the connectors are located at an upper end of the slots 96 and 98. Each of the slots 90, 96, and 98 are configured to accommodate the offset spacing between the spindle 66 and the pivot 84. As the swing arm 68 moves, the roller slot 90 and the slots 96 and 98 compensate for the fact that the spindle 66 and the pivot 88 do not share the same pivot point.

Figure 5:
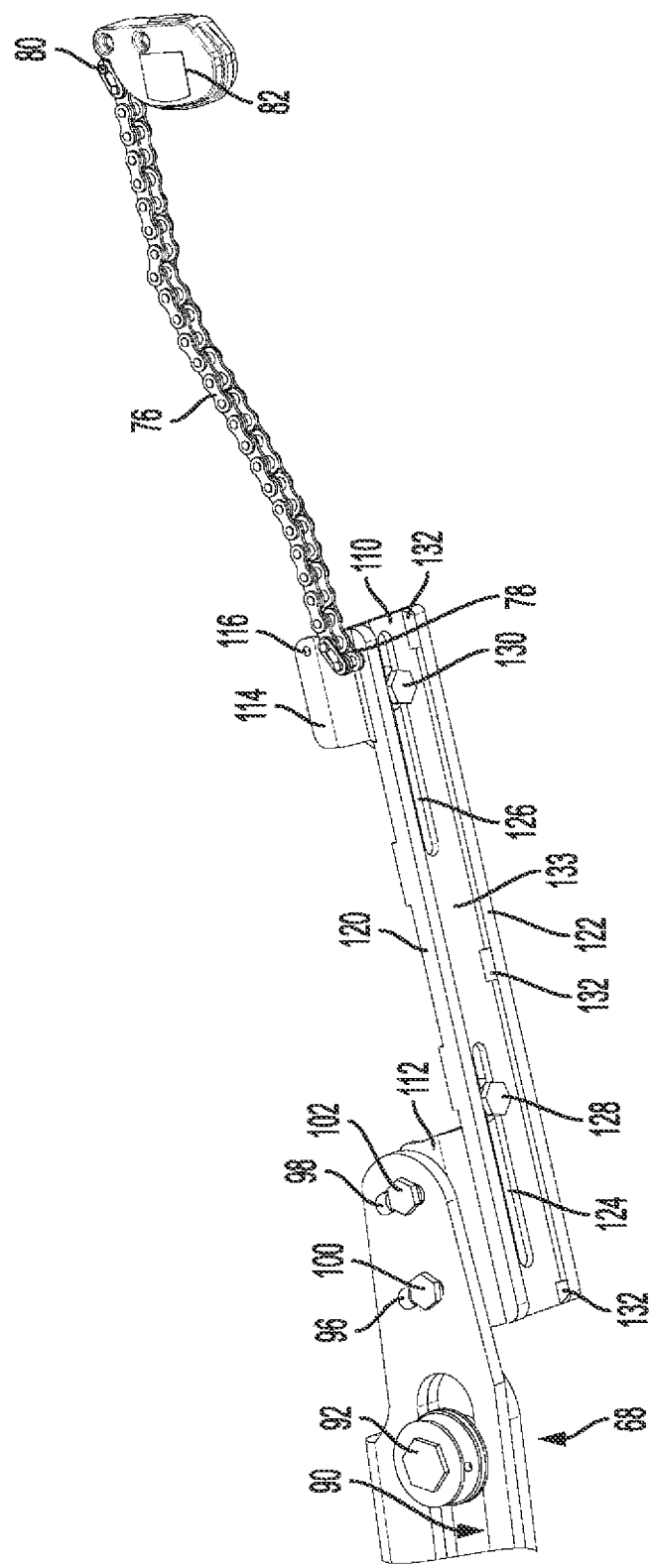
FIG. 5 illustrates a perspective view of a link assembly coupled to an end of a swing arm.
Figure 6:
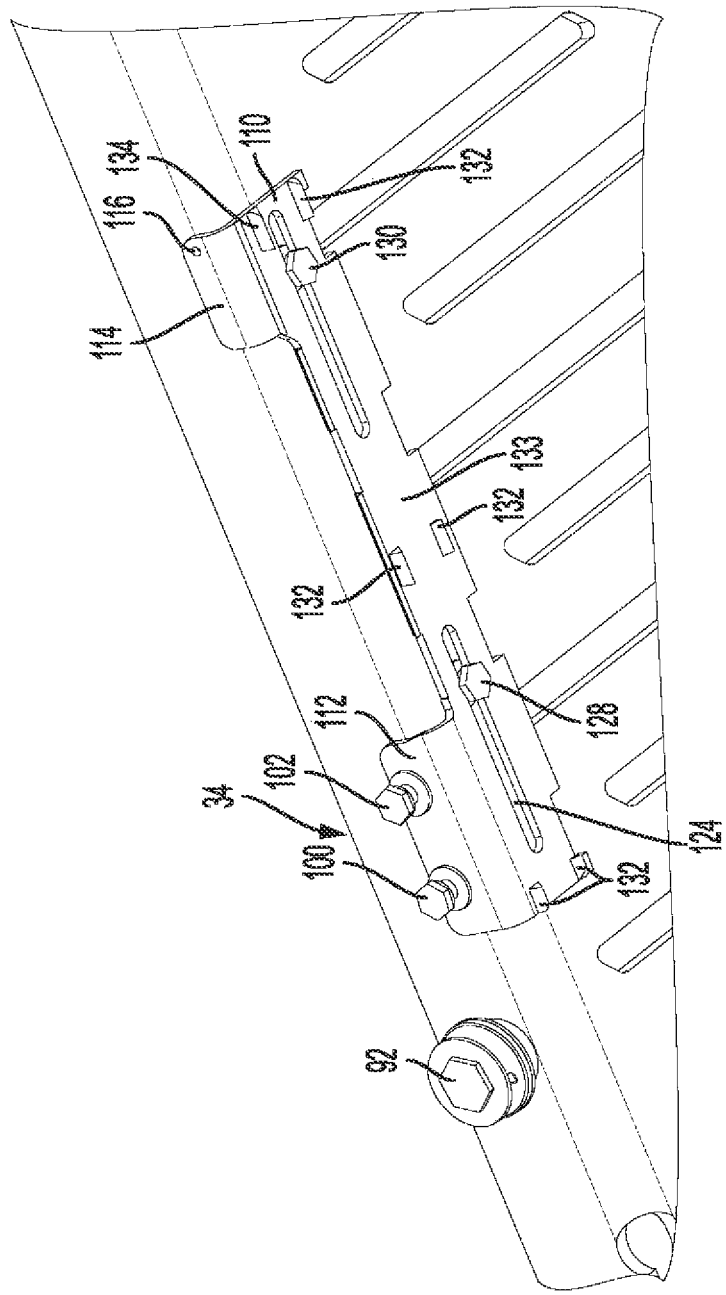
FIG. 6 illustrates a perspective view of a portion of a link assembly coupled to a ramp plate.

As further seen in FIGS. 4 and 5, the link bar 74 of the link assembly 70 includes a generally flat main portion 110 that includes a first angled portion 112, or first bend, located at one end of the link bar 74 and a second angled portion 114, or second bend, located at another end of the link bar 74. The first angled portion 112 fixedly supports the first connector 100 and the second connector 102 each of which extends respectively through the slots 96 and 98. (See also FIG. 6) The second angled portion 114 includes an aperture 116 to which one end of the flexible link 76 is coupled. In this illustration, the flexible link 76 is disconnected from the second angled portion 114 to illustrate the aperture 116. Use of the link bar 74 reduces the overall width of the ramp assembly 30 enable the ramp assembly 30 to be used in a larger number of vehicles having differently sized vehicle openings 22.

The link assembly 70 further includes a first link rod 120 and a second link rod 122 located and fixedly attached to either side of the link bar 110. The link bar 110 includes a first bar slot 124 and a second bar slot 126. See also FIG. 6. The link bar 110, or slide bar, is held against an underneath side of the first ramp plate 34 by a first slot connector 128 and a second slot connector 130 that enable the link bar 110 to move or slide along the underneath side of the first ramp plate 34. The first slot connector 128 and the second slot connector 130 are fixed to the first ramp plate 34 and extend through respective slots 124 and 126. The link bar 110 slides with respect to the first slot connector 128 and the second slot connector 130 as the ramp 32 moves between the retracted and extended positions. The link bar 110, by moving with respect to the first ramp plate 34, maintains tension of the flexible link 76 when the ramp moves. Welds 132 indicate weld locations between the link bar 110 and the first and second link rods 120 and 122.

Figure 7:
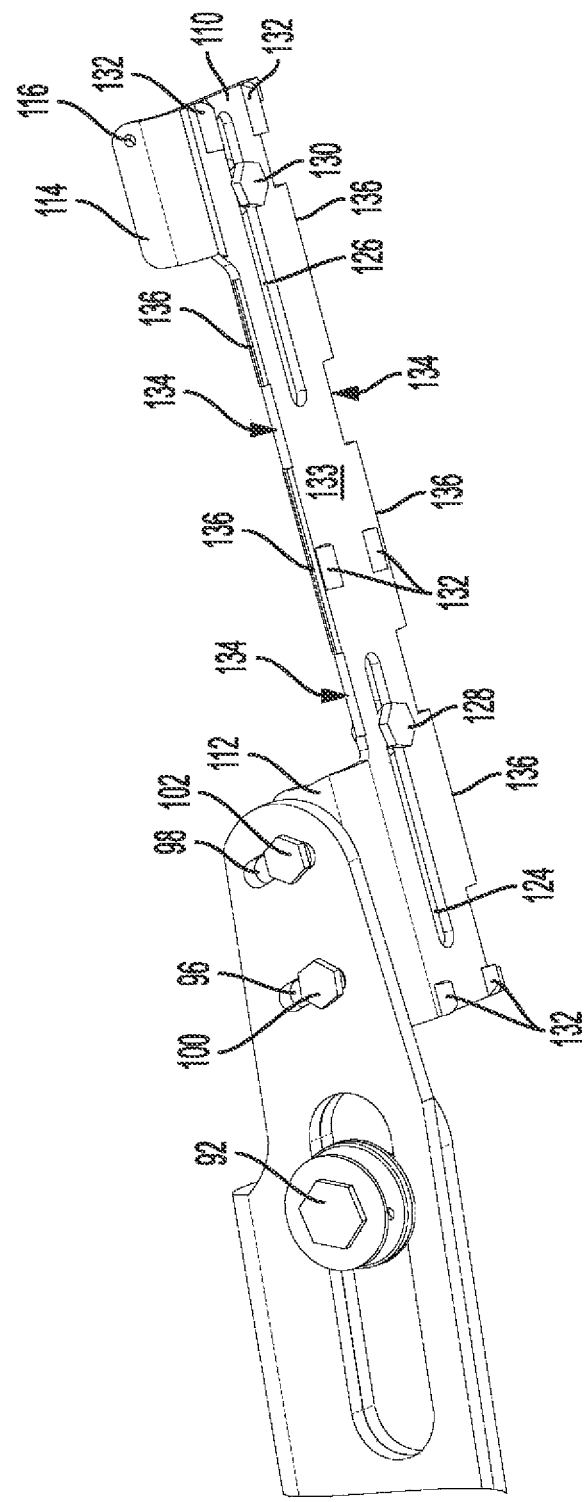
FIG. 7 illustrates perspective view of a portion of a link bar coupled to an end of a swing arm.
Figure 8:
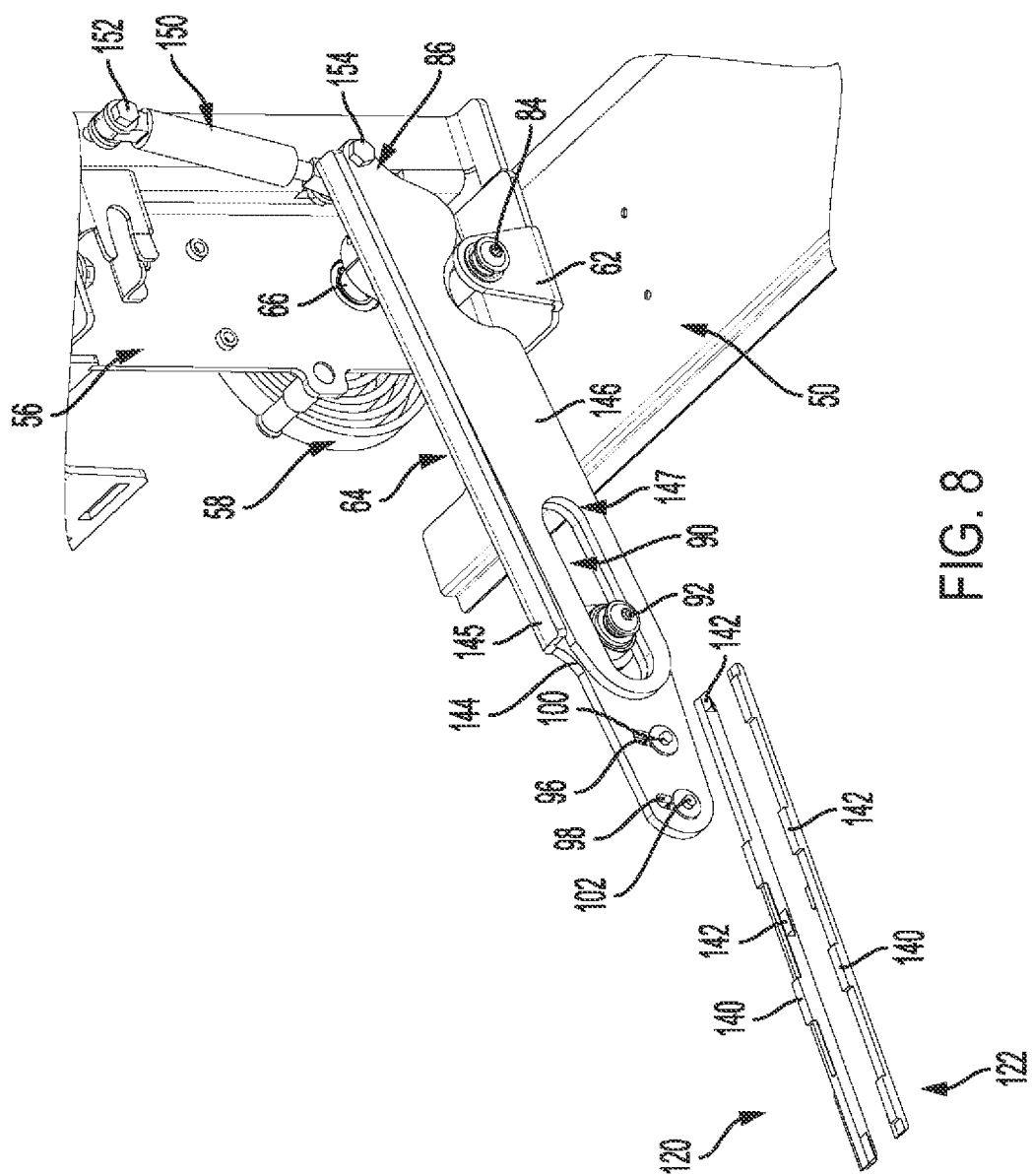
FIG. 8 illustrates a perspective view of a ramp fold arm coupled to a ramp assist assembly.

Link rods 120 and 122 are fixed to the link bar 110, by welding for instance, at the welds 132. As seen in FIG. 7, the first link rod 120 and the second link rod 122 have been removed to illustrate features of the link bar 110 including cutouts 134 that are recessed from edges 136. The cutouts 134 receive tabs 140 of the link bars 120 and 122 as seen in FIG. 8. The link rods 120 and 122 provide additional stability to the link bar 110 to reduce the likelihood of bending or twisting of the link bar 110.

In FIG. 8, the link bar 110 has been removed to illustrate the tabs 140 which extend vertically from the link rods 120 and 122 to engage cutouts 134 of the link bar 110. The link rods 120 and 122 further include lateral extending welds 142 that subtend the link bar 110 when the link bar 110 is located at the underside of the first ramp plate 34. The welds 142 are used to fix the link bar 110 to the link rods 120 and 122. While welds 132 and 142 are illustrated at specific locations, in other embodiments welds are located at other locations. In another embodiment, the link bar 110 and link rods 120 and 122 are formed as a single molded or cast part.

FIG. 8 further illustrates the ramp fold arm 64 which includes a first arm 144 including slots 96 and 98 and a second arm 146 that is located adjacent to the first fold arm 144 to provide additional structural support for the ramp fold arm 64. A flange 145 of the first arm 144 extends over an edge of the second arm 146 to provide structural support. The second arm 146 includes a slot 147. In one embodiment, the second arm 146 is formed of an ultra-high molecular weight (UHMW) polyethylene which provides additional rigidity to the first arm 144. Other materials are contemplated. The second arm 146 is located between the first arm 144 and the sidewall 93 of the first ramp plate 34 to stabilize the ramp 32. The stabilization provided by the second arm 146 reduces twisting and side to side movement of the ramp 32 for external forces by strengthening the ramp fold arm 64.

The ramp fold arm 64 rotates at the spindle 66 of the clock spring 58. A gas spring 150 includes a first end 152 connected to the support structure 56 and a second end 154 connected to the first end 86 of the ramp fold arm 64. The gas spring 150 controls movement of the ramp 32 when moving between the retracted position and the extended position. When the ramp 32 is being extended, the gas spring slows down movement of the ramp 32. When the ramp 32 is being retracted, the gas spring 150 provides an assist when the ramp 32 is raised from the extended position to the retracted position. Other types of springs are contemplated including mechanical springs and dampers.

While exemplary embodiments incorporating the principles of the present invention have been disclosed herein, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A ramp assembly being moveable between a retracted position and a deployed position, wherein in the deployed position the ramp assembly is configured to provide rolling access to a passenger vehicle, the ramp assembly comprising:
    a first ramp plate;
    a second ramp plate rotatably coupled to the first ramp plate;
    a ramp assist assembly;
    a ramp fold arm coupled to the ramp assist assembly and to the first ramp plate, wherein the ramp assist assembly is configured to assist in moving the ramp assembly from the deployed position to the retracted position; and
    a link system connected to the ramp fold arm and to the second ramp plate, wherein the link system includes a slide mechanism coupled to an underside of the first ramp plate, wherein the underside faces a ground when the ramp assembly is in the deployed position, and wherein the slide mechanism and ramp fold arm are collectively configured to slide relative to the first ramp plate as the first ramp plate is moved between the retracted position and the deployed position;
    wherein the slide mechanism includes a slide bar slidably connected to the underside of the first ramp plate;
    wherein the slide bar includes a generally planar portion connected to the underside of the first ramp plate, a first bend extending from the planar portion, and a second bend extending from the planar portion, wherein the first bend is coupled to the second ramp plate and the second bend is coupled to the ramp fold arm.

2. The ramp assembly of claim 1 wherein the link system includes a cam coupled to the second ramp plate and a flexible link coupled to the slide bar and to the cam.

3. The ramp assembly of claim 1 wherein the slide bar is disposed at least partially underneath the underside of the first ramp plate.

4. The ramp assembly of claim 1 further comprising a first connector coupled to the underside of the first ramp plate, wherein a slot of the generally planar portion slidingly engages the first connector.

5. The ramp assembly of claim 4 further comprising a roller connected to the first ramp plate, and the ramp fold arm includes a roller slot, wherein the roller extends through the roller slot, to enable the ramp fold arm to move with respect to the first ramp plate.

6. The ramp assembly of claim 5 further comprising a second connector coupled to the ramp fold arm and to the second bend of the slide bar.

7. The ramp assembly of claim 6 wherein the ramp fold arm includes a connector slot and the second connector extends through the connector slot to enable the slide bar to move with respect to the ramp fold arm.

8. The ramp assembly of claim 7 wherein the connector slot is inclined with respect to the roller slot.

9. The ramp assembly of claim 5 wherein the slide mechanism includes a link rod connected to the slide bar to provide support to the slide bar.

10. A passenger vehicle to transport a passenger confined to a wheelchair, the passenger vehicle comprising:
    an entry to enable the passenger confined to the wheelchair to exit and to enter an interior of the vehicle; and
    a ramp assembly located at the entry, the ramp assembly being moveable between a retracted position and a deployed position, wherein in the deployed position the ramp assembly is configured to provide rolling access to the entry, the ramp assembly including a first ramp plate, a second ramp plate rotatably coupled to the first ramp plate, a ramp assist assembly, a ramp fold arm assembly coupled to the ramp assist assembly and to the first ramp plate, wherein the ramp assist assembly is configured to assist in moving the ramp assembly from the deployed position to the retracted position, and a link system connected to the ramp fold arm assembly and to the second ramp plate, wherein the link system includes a slide mechanism coupled to an underside of the first ramp plate, wherein the underside faces a ground when the ramp assembly is in the deployed position, and wherein the slide mechanism and ramp fold arm are collectively configured to slide relative to the first ramp plate as the first ramp plate is moved between the retracted position and the deployed position when the ramp assembly is in the deployed position;
    wherein the slide mechanism includes a slide bar slidably connected to the underside of the first ramp plate;
    wherein the slide bar includes a generally planar portion slidably connected to the underside of the first ramp plate, a first bend extending from the planar portion, and a second bend extending from the planar portion, wherein the first bend is coupled to the second ramp plate and the second bend is coupled to the ramp fold arm.

11. The passenger vehicle of claim 10 wherein the link system includes a cam coupled to the second ramp plate and a flexible link coupled to the slide bar and to the cam.

12. The passenger vehicle of claim 10 wherein the slide bar is disposed at least partially underneath the underside of the first ramp plate.

13. The passenger vehicle of claim 10 further comprising a first connector coupled to the underside of the first ramp plate, wherein a slot of the generally planar portion slidingly engages the connector.

14. The passenger vehicle of claim 13 further comprising a second connector coupled to the ramp fold arm and to the second bend of the slide bar.

15. The passenger vehicle of claim 14 wherein the ramp fold arm includes a connector slot and the second connector extends through the connector slot to enable the slide bar to move with respect to the ramp fold arm.

16. A method of deploying and retracting the ramp assembly of the passenger vehicle of claim 10, the method comprising:
- providing the ramp assembly of the passenger vehicle of claim 10;
- during a deploying operation, coiling a clock spring as the ramp assembly is moved from the retracted position toward the deployed position;
- while coiling the clock spring, extending the second ramp plate from the first ramp plate as the slide mechanism moves in a first direction along the first ramp plate to deploy the ramp assembly;
- during a retracting operation, uncoiling the clock spring by raising the ramp assembly from the deployed position to the retracted position; and
- while uncoiling the clock spring, moving the second ramp plate toward the first ramp plate as the slide mechanism moves in a second direction along the first ramp plate to stow the ramp assembly.

* * * * *